(12) United States Patent
Chen (10) Patent No.: US 10,379,628 B2
(45) Date of Patent: Aug. 13, 2019

(54) TRACKING SYSTEM, VIRTUAL REALITY SYSTEM AND ATTACHABLE DEVICE

(71) Applicant: HTC Corporation, Taoyuan (TW)

(72) Inventor: Yang-Cheng Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 51 days.

(21) Appl. No.: 15/717,936

(22) Filed: Sep. 27, 2017

(65) Prior Publication Data

US 2019/0094989 A1    Mar. 28, 2019

(51) Int. Cl.
*G06F 3/03* (2006.01)
*G06F 1/16* (2006.01)
*G06F 3/01* (2006.01)

(52) U.S. Cl.
CPC ............ *G06F 3/0325* (2013.01); *G06F 1/163* (2013.01); *G06F 3/012* (2013.01)

(58) Field of Classification Search
CPC ......... G06F 1/163; G06F 3/012; G06F 3/0325
USPC .................................................... 345/8, 156
See application file for complete search history.

(56) References Cited

U.S. PATENT DOCUMENTS

| | | | | |
|---|---|---|---|---|
| 2003/0210812 A1* | 11/2003 | Khamene | ............... | A61B 90/36 382/128 |
| 2012/0287284 A1* | 11/2012 | Jacobsen | ................. | G06F 1/163 348/158 |
| 2013/0300649 A1* | 11/2013 | Parkinson | ............ | G02B 27/017 345/156 |
| 2014/0085452 A1* | 3/2014 | Nistico | ................ | A61B 3/0008 348/78 |
| 2015/0364113 A1* | 12/2015 | Ahn | ........................ | G09G 5/12 345/156 |
| 2016/0140930 A1* | 5/2016 | Pusch | ..................... | G06F 3/011 345/633 |
| 2016/0170482 A1* | 6/2016 | Yajima | ................... | G06F 3/012 345/8 |
| 2018/0306898 A1* | 10/2018 | Pusch | ..................... | G06F 3/011 |

* cited by examiner

*Primary Examiner* — Tony O Davis
(74) *Attorney, Agent, or Firm* — CKC & Partners Co., LLC (57) ABSTRACT

A tracking system includes an attachable device and a tracking device. The attachable device is removably mounted on a head mounted display device. The attachable device includes an optical emitting module for emitting optical radiation. The tracking device is communicated with the attachable device. The tracking device includes an optical sensor for receiving the optical radiation. The tracking device calculates spatial coordinates of the attachable device relative to the tracking device according to the optical radiation sensed by the optical sensor. The tracking device transmits the spatial coordinates to the attachable device or the head mounted display device.

18 Claims, 10 Drawing Sheets

TRACKING SYSTEM, VIRTUAL REALITY SYSTEM AND ATTACHABLE DEVICE

BACKGROUND

Field of Invention

The disclosure relates to a tracking system. More particularly, the disclosure relates to a tracking system for allocating a position of a head mounted display device.

Description of Related Art

Recently, applications for virtual reality (VR) experiences are well developed. Various solutions, including high-end systems (e.g., HTC VIVE, Oculus Rift) to low-cost systems (e.g., google cardboard), are introduced to provide VR experiences to users.

One important feature of the virtual reality experiences is that the user can move freely in virtual scene and visions seen by the user will vary accordingly. To achieve aforesaid feature, the virtual reality system requires a tracking manner to monitor a movement of the user. On the high-end systems, there are many solutions to detect the movement precisely. However, on the low-cost systems, it is hard to sense the movement of the user.

On the other hands, to achieve interaction between different users in the virtual reality scene, the virtual reality system is required to track individual positions of different users. However, it is hard to track multiple positions of different users at once, especially for low-cost virtual reality systems.

SUMMARY

The disclosure provides a tracking system, which includes an attachable device and a tracking device. The attachable device is capable of being removably mounted on a head mounted display device. The attachable device includes an optical emitting module for emitting optical radiation. The tracking device is communicated with the attachable device. The tracking device includes an optical sensor for receiving the optical radiation. The tracking device calculates spatial coordinates of the attachable device relative to the tracking device according to the optical radiation sensed by the optical sensor. The tracking device transmits the spatial coordinates to the attachable device or the head mounted display device.

The disclosure further provides an attachable device which is capable of being mounted on a head mounted display device. The attachable device includes a local communication module and an optical emitting module. The local communication module is configured to communicate with a tracking device. The local communication module receives a light emitting configuration from the tracking device. The optical emitting module is configured for generating optical radiation according to the light emitting configuration. After the optical emitting module generates the optical radiation, the local communication module is configured to receive spatial coordinates from the tracking device, and the spatial coordinates indicate a location of the attachable device relative to the tracking device.

The disclosure further provides a virtual reality system, which includes a first head mounted display device and a tracking device. The first head mounted display device includes a first optical emitting module and a tracking device. The first optical emitting module is configured for emitting first optical radiation. The tracking device is communicated with the first head mounted display device. The tracking device includes an optical sensor for receiving the first optical radiation. The tracking device calculates first spatial coordinates of the first head mounted display device relative to the tracking device according to the first optical radiation sensed by the optical sensor. The tracking device transmits the first spatial coordinates to the first head mounted display device.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
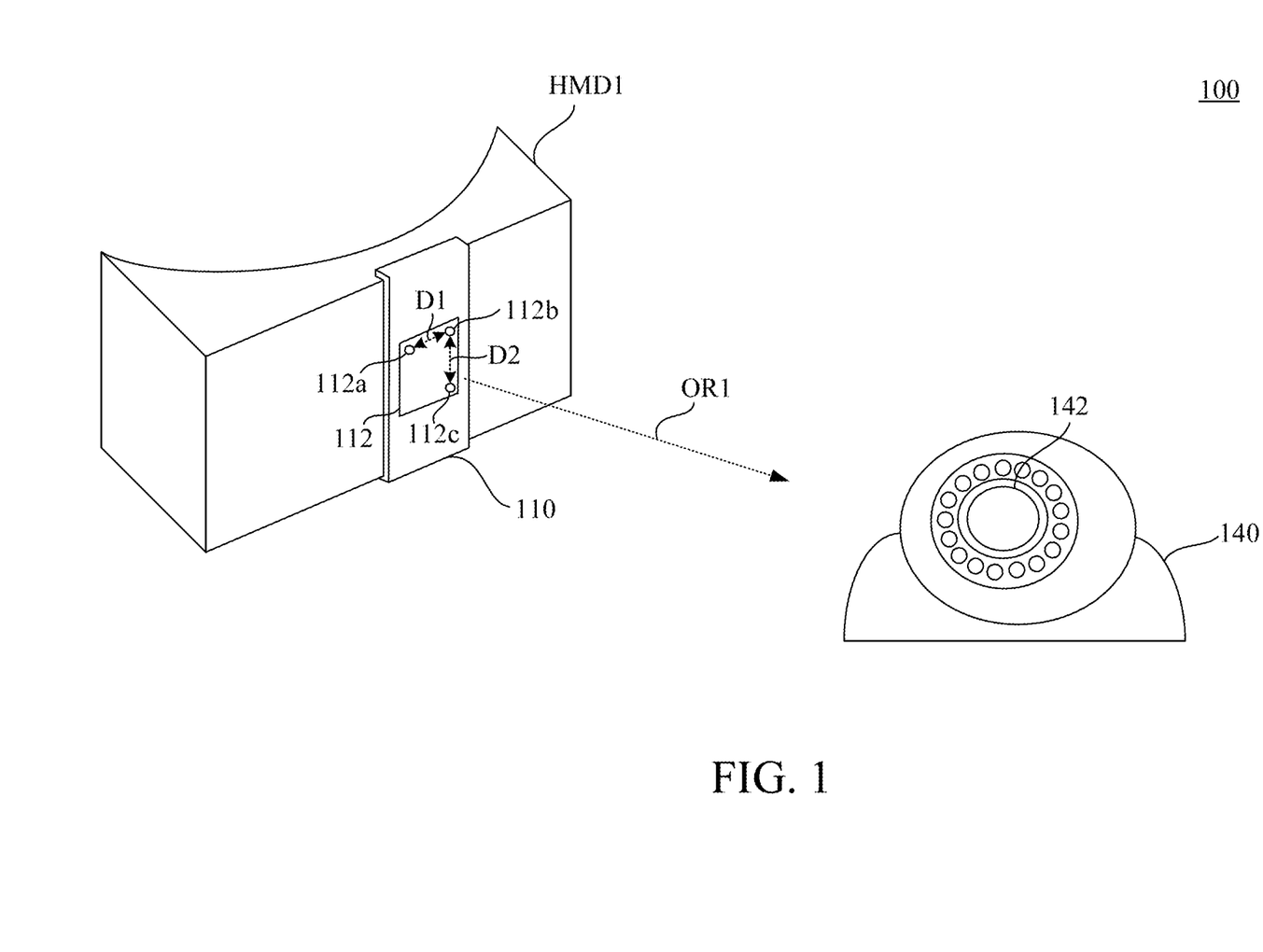
FIG. 1 is a schematic diagram illustrating a tracking system according to an embodiment of the disclosure.

Reference is made to FIG. 1, which is a schematic diagram illustrating a tracking system 100 according to an embodiment of the disclosure. As shown in FIG. 1, the tracking system 100 includes an attachable device 110 and a tracking device 140.

In an embodiment, the attachable device 110 is an add-on attachment removably mounted on a head mounted display device HMD1. In the embodiment shown in FIG. 1, the attachable device 110 includes a holding clamp to hold the attachable device 110 on a surface of the head mounted display device HMD1. However, the attachable device 110 is not limited to be attached on the head mounted display device HMD1 in the manner shown in FIG. 1. For example, the attachable device 110 can be fastened on the head mounted display device HMD1 by a connector, such as a clamp, a screw, a lock or a buckle.

The head mounted display device HMD1 can be a virtual reality (VR), augmented reality (AR), substitutional reality (SR) or mixed reality (MR) headset. A user wearing the head mounted display device HMD1 can view a VR/AR/SR/MR scene on a display on the head mounted display device HMD1.

In an embodiment, the head mounted display device HMD1 is a combination of a headset holder (e.g., Google cardboard) and a smartphone, or the head mounted display device HMD1 is a standalone VR/AR/SR/MR headset (e.g., Google daydream). In some cases, the head mounted display device HMD1 itself does not include a tracking function to track a movement of the user wearing the head mounted display device HMD1. In the embodiment, the head mounted display device HMD1 is not able obtain spatial coordinates of the head mounted display device HMD1 on its own. The tracking system 100 is able to track and provide the spatial coordinates about the head mounted display device HMD1.

In another embodiment, the tracking system 100 can be utilized onto the head mounted display device HMD1 which includes a tracking function by itself. The tracking system 100 can enhance a preciseness of the tracking function, and in addition the tracking system 100 can provide the head mounted display device HMD1 about the spatial information about other head mounted display devices in the surrounding area.

As shown in FIG. 1, the attachable device 110 includes an optical emitting module 112 for emitting optical radiation OR1. The optical radiation OR1 sensed by the tracking device 140. As shown in FIG. 1, the tracking device 140 includes an optical sensor 142 for receiving the optical radiation OR1. The tracking device 140 is configured to calculate spatial coordinates of the attachable device 110 relative to the tracking device 140 according to the optical radiation OR1 sensed by the optical sensor 140. Details about how to calculate the spatial coordinates will be discussed later. The tracking device 140 is communicated with the attachable device 110 and/or the head mounted display device HMD1. The tracking device 140 transmits the spatial coordinates to the first attachable device 110 or the first head mounted display device HMD1.

Since the attachable device 110 is attached onto the head mounted display device HMD1, the spatial coordinates corresponding to the attachable device 110 can represent a position of the head mounted display device HMD1 in the space. The head mounted display device HMD1 can acknowledge its position in the space based on the spatial coordinates via the tracking system 100.

Figure 2:
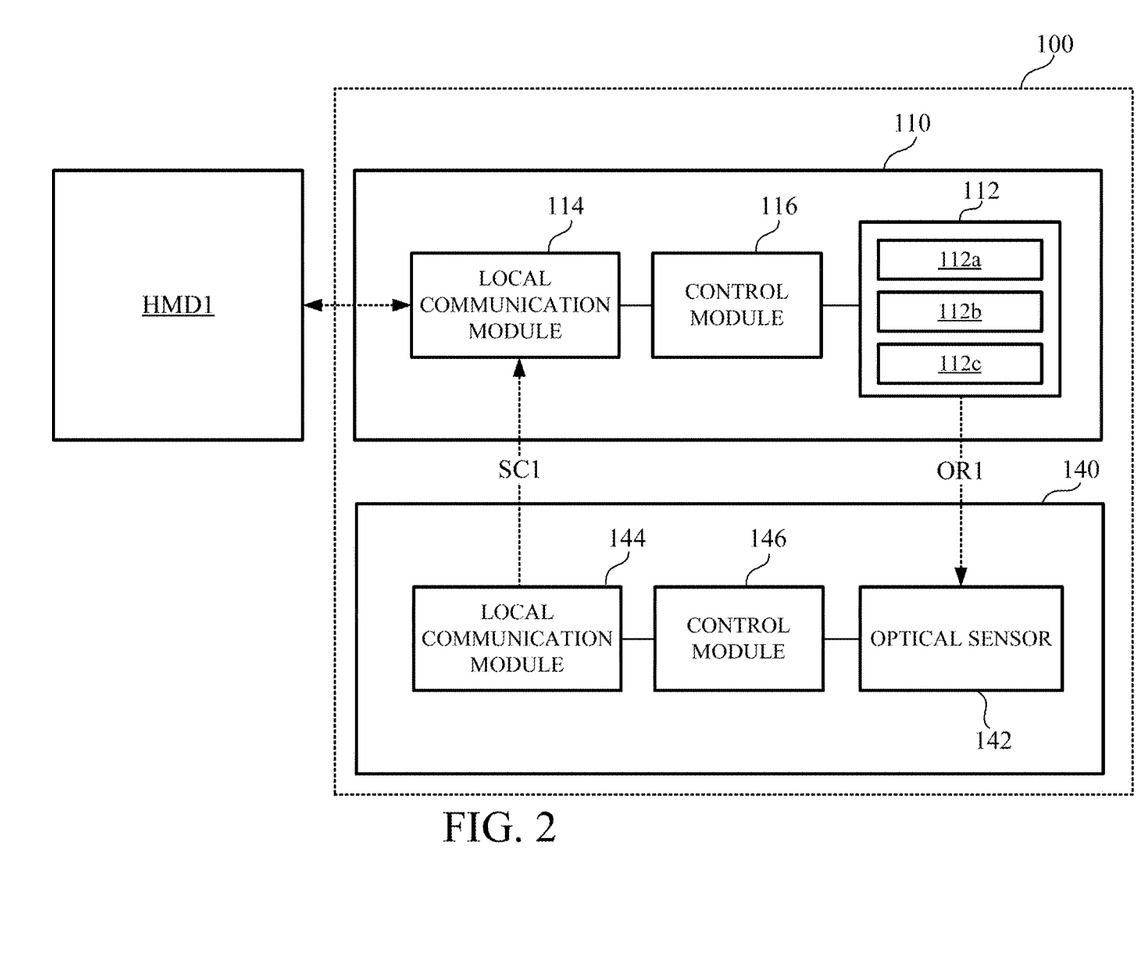
FIG. 2 is a function block diagram of the tracking system shown in FIG. 1.

Reference is made to FIG. 2, which is a function block diagram of the tracking system 100 shown in FIG. 1. As an embodiment shown in FIG. 2, the attachable device 110 includes the optical emitting module 112, a local communication module 114 and a control module 116. The local communication module 114 is configured for communicating with the tracking device 140 and/or the head mounted display device HMD1. The local communication module 114 can include at least one of a Bluetooth Low-Energy (BLE) transceiver, a Near Field Communication (NFC) transceiver, a WiFi-direct transceiver, a Zigbee transceiver and any equivalent transceiver. The control module 116 can includes a central processing unit, a processor, a control integrated circuit and/or an image processor. In another embodiment, the attachable device 110 may include a wired connection interface (e.g., a USB connector, an Ethernet connector or a coaxial cable connector, not shown in figures) which is electrically connected to the tracking device 140 and/or the head mounted display device HMD1.

In an embodiment, the local communication module 114 can include one type of transceiver to communicate with the tracking device 140 and the head mounted display device HMD1. In another embodiment, the local communication module 114 can include two types of transceivers to communicate with the tracking device 140 and the head mounted display device HMD1 respectively. For example, the local communication module 114 can includes a NFC transceiver to communicate with the head mounted display device HMD1 and a BLE transceiver to communicate with the tracking device 140.

As an embodiment shown in FIG. 2, the tracking device 140 includes the optical sensor 142, a local communication module 144 and a control module 146. The local communication module 144 is configured for communicating with the attachable device 110 and/or the head mounted display device HMD1. The local communication module 144 can include at least one of a Bluetooth Low-Energy (BLE) transceiver, a Near Field Communication (NFC) transceiver, a WiFi-direct transceiver, a Zigbee transceiver and any equivalent transceiver. The control module 146 can includes a central processing unit, a processor, a control integrated circuit and/or an image processor.

As the embodiment shown in FIG. 1 and FIG. 2, the optical emitting module 112 includes multiple light emitting units. In the demonstrational case shown in FIG. 1 and FIG. 2, the optical emitting module 112 includes three light emitting units 112a, 112b and 112c. The light emitting units 112a, 112b and 112c are disposed on the attachable device 110, and each of the light emitting units 112a, 112b and 112c are spaced from each other. The light emitting units 112a, 112b and 112c are configured to emit the optical radiation OR1. Accordingly, the optical radiation OR1 sensed by the optical sensor 142 of the tracking device 140 will include a plurality of radiation spots corresponding to the light emitting units 112a, 112b and 112c.

Figure 3A:
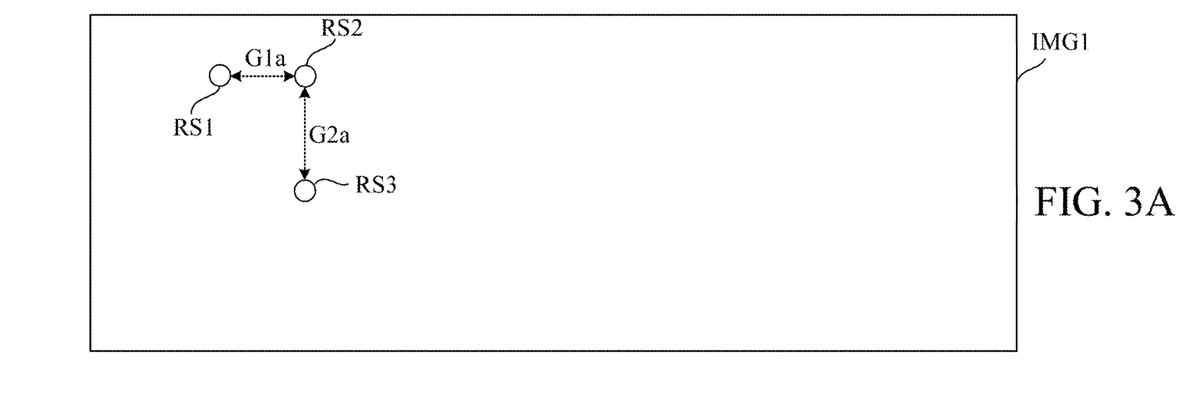
FIG. 3A is a schematic diagram illustrating an image sensed by an optical sensor corresponding to an optical radiation.
Figure 3B:
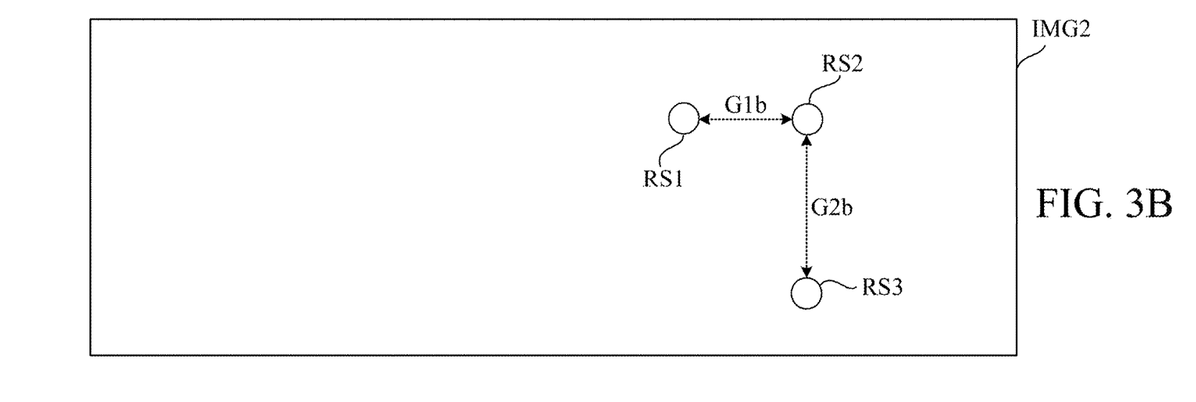
FIG. 3B is a schematic diagram illustrating another image sensed by an optical sensor corresponding to an optical radiation.

Reference is further made to FIG. 3A and FIG. 3B. FIG. 3A is a schematic diagram illustrating an image IMG1 sensed by the optical sensor 142 corresponding to the optical radiation OR1. FIG. 3B is a schematic diagram illustrating another image IMG2 sensed by the optical sensor 142 corresponding to the optical radiation OR1.

As shown in FIG. 1, the light emitting units 112a, 112b and 112c are spaced from each other. For example, the light emitting units 112a and 112b are gapped by a distance D1, and the light emitting units 112b and 112c are gapped by another distance D2.

In the images IMG1 and IMG2 sensed by the optical sensor 142, there are three radiation spots RS1, RS2 and RS3 corresponding to the light emitting units 112a, 112b and 112c. The tracking device 140 calculates the spatial coordinates of the attachable device 110 according to at least one of a dimension of the radiation spots RS1, RS2 and RS3, a distribution of the radiation spots RS1, RS2 and RS3 or a signal strength of the optical radiation OR1 sensed by the optical sensor 142.

In some embodiments, the distribution of the radiation spots RS1, RS2 and RS3 includes locations of the radiation spots RS1, RS2 and RS3 within the image IMG1/IMG2. For example, a horizontal position and a vertical position of the attachable device 110 related to the tracking device 140 can be calculated by the control module 146 of the tracking device 140 according to the locations of the radiation spots RS1, RS2 and RS3. If the optical radiation OR1 sensed by the optical sensor 142 is the case of the image IMG1 shown in FIG. 3A, the attachable device 110 is located on the left side and on the top level relative to the tracking device 140. If the optical radiation OR1 sensed by the optical sensor 142 is the case of the image IMG2 shown in FIG. 3B, the attachable device 110 is located on the right side and in the middle level relative to the tracking device 140.

In some embodiments, the dimension of the radiation spots RS1, RS2 and RS3 includes gapping distances between the radiation spots RS1, RS2 and RS3 shown in the image IMG1/IMG2. For example, a depth position of the attachable device 110 related to the tracking device 140 can be calculated by the control module 146 of the tracking device 140 according to the gapping distances (e.g., G1a, G2a in FIG. 3A or G1b, G2b in FIG. 3B) between the radiation spots RS1, RS2 and RS3. If the optical radiation OR1 sensed by the optical sensor 142 is the case of the image IMG1 shown in FIG. 3A, the gapping distance G1a between the radiation spots RS1 and RS2 and the gapping distance G2a between the radiation spots RS2 and RS3 are relatively shorter, and it indicates the attachable device 110 is located relatively far from the tracking device 140. If the optical radiation OR1 sensed by the optical sensor 142 is the case of the image IMG2 shown in FIG. 3B, the gapping distance G1b between the radiation spots RS1 and RS2 and the gapping distance G2b between the radiation spots RS2 and RS3 are relatively longer, and it indicates the attachable device 110 is located relatively adjacent to the tracking device 140. In an embodiment, the depth position of the attachable device 110 related to the tracking device 140 can be calculated by a ratio between the gapping distances (e.g., G1a, G2a in FIG. 3A or G1b, G2b in FIG. 3B) and the spacing distances (e.g., D1 and D2 in FIG. 1) between the light emitting units 112a, 112b and 112c.

In some embodiments, the depth position of the attachable device 110 related to the tracking device 140 can be calculated according to a signal strength of the optical radiation OR1 sensed by the optical sensor 142. If the signal strength is at a higher level, the attachable device 110 is closer. If the signal strength is at a lower level, the attachable device 110 is farther.

As explained above, if the optical radiation OR1 sensed by the optical sensor 142 is the case of the image IMG1 shown in FIG. 3A, the spatial coordinates SC1 of the attachable device 110 will be calculated to be located on the left side, on the top level and at the far end relative to the tracking device 140. The spatial coordinates SC1 can be [−5, 2, 10]. The index "−5" indicates that the attachable device 110 is located on the left side relative to the tracking device 140. The index "2" indicates that the attachable device 110 is located on the top level relative to the tracking device 140. The index "10" indicates that the attachable device 110 is located far from the tracking device 140.

On the other hand, if the optical radiation OR1 sensed by the optical sensor 142 is the case of the image IMG2 shown in FIG. 3B, the spatial coordinates SC1 of the attachable device 110 will be calculated to be located on the right side, on the middle level and at the near end relative to the tracking device 140. The spatial coordinates SC1 can be [4, 0, 3]. The index "4" indicates that the attachable device 110 is located on the right side relative to the tracking device 140. The index "0" indicates that the attachable device 110 is located on the middle level relative to the tracking device 140. The index "3" indicates that the attachable device 110 is located near to the tracking device 140.

In an embodiment shown in FIG. 1, the distance D1 between the light emitting units 112a and 112b is configured to be different from the distance D2 between the light emitting units 112b and 112c. For example, the distance D2 is 1.5 times as long as the distance D1. Correspondingly, the gapping distance G1a shown in FIG. 3A is different from the gapping distance G2a shown in FIG. 3A. In this case, the gapping distance G2a is 1.5 times as long as the gapping distance G1a. Based on aforesaid proportion between the gapping distance G1a and the gapping distance G2a, the tracking device 140 is able to recognize that the gapping distance G1a corresponds to the distance D1 and the gapping distance G2a corresponds to the distance D2. Referring to FIG. 1 and FIG. 3A, based on aforesaid proportion between the gapping distance G1a and the gapping distance G2a, the tracking device 140 is able to recognize that the radiation spot RS1 corresponds to the light emitting unit 112a, the radiation spot RS2 corresponds to the light emitting unit 112b and the radiation spot RS3 corresponds to the light emitting unit 112c.

Similarly, referring to FIG. 1 and FIG. 3B, based on aforesaid proportion between the gapping distance G1b and the gapping distance G2b, the tracking device 140 is able to recognize that the radiation spot RS1 corresponds to the light emitting unit 112a, the radiation spot RS2 corresponds to the light emitting unit 112b and the radiation spot RS3 corresponds to the light emitting unit 112c.

In an embodiment, the difference existed between the distance D1 and the distance D2 will help the tracking device 140 to recognize a mapping relationship between the radiation spots in the image IMG1 sensed by the optical sensor 142 and the light emitting units on the attachable device 110. The tracking device 140 is further configured to detect a tilted angle of the attachable device 110 (along with the head mounted display device HMD1) according to the radiation spots.

Figure 3C:
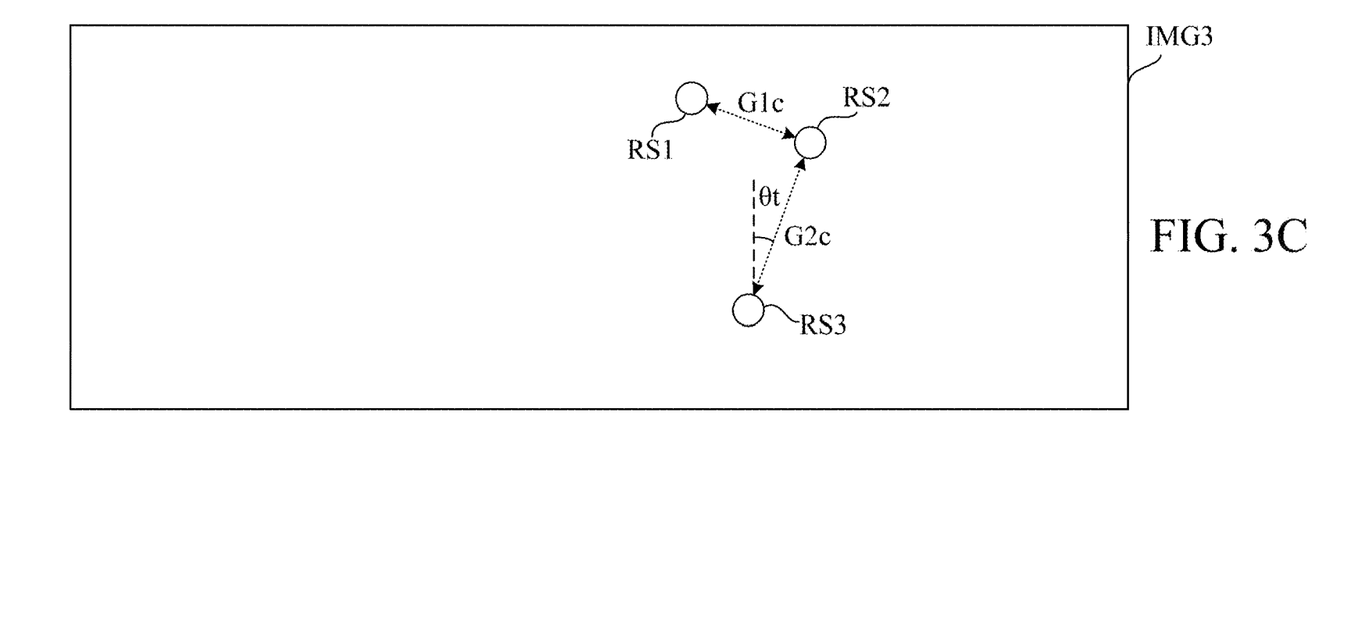
FIG. 3C is a schematic diagram illustrating another image sensed by an optical sensor corresponding to an optical radiation.

Reference is further made to FIG. 3C, which is a schematic diagram illustrating another image IMG3 sensed by the optical sensor 142 corresponding to the optical radiation OR1. As shown in FIG. 3C, the gapping distance G1c and the gapping distance G2c are found in the image IMG3. Referring to FIG. 1 and FIG. 3C, based on a proportion between the gapping distance G1c and the gapping distance G2c (e.g., the gapping distance G2c is 1.5 times as long as the gapping distance G1c), the tracking device 140 is able to recognize that the radiation spot RS1 corresponds to the light emitting unit 112a, the radiation spot RS2 corresponds to the light emitting unit 112b and the radiation spot RS3 corresponds to the light emitting unit 112c. In this case, the tracking device 140 is able to calculate a tilted angle $\theta t$ as shown in FIG. 3C according to the image IMG3. In this case, the tilted angle $\theta t$ is found between a vertical line and a straight line passing the radiation spots RS2 and RS3. Based on the image IMG3 sensed by the optical sensor 142, the tracking device 140 can detect that the attachable device 110 (along with the head mounted display device HMD1) is rotated to the right by the tilted angle $\theta t$. Similarly, when the attachable device 110 is rotated to different directions or different angles, the tracking device 140 is able to detect the rotation on the attachable device 110.

In an embodiment, the optical emitting module 112 is an infrared emitting module, and the light emitting units 112a, 112b and 112c are infrared emitters. In this case, the optical sensor 142 of the tracking device 140 is an infrared camera. The infrared camera is able to operate at a higher frame rate compared to a full spectrum camera, such that the tracking device 140 can track the position of the attachable device 110 at high frequency.

In another embodiment, the optical emitting module 112 is a visible light emitting module, and the light emitting units 112a, 112b and 112c are visible emitters. In this case, the optical sensor 142 of the tracking device 140 is a full spectrum camera.

Based on aforesaid embodiments, the control module 146 of the tracking device 140 is able to calculate the spatial coordinates SC1 of the attachable device 110.

In an embodiment, the tracking device 140 will transmit the spatial coordinates SC1 through the local communication module 144 to the attachable device 110 as shown in FIG. 2. The attachable device 110 can acknowledge its spatial coordinates SC1 in the space, and the attachable device 110 can transmit the spatial coordinates SC1 to the head mounted display device HMD1, such that the head mounted display device HMD1 acknowledge its spatial coordinates SC1 in the space.

In another embodiment, the tracking device 140 will transmit the spatial coordinates SC1 through the local communication module 144 directly to the head mounted display device HMD1 not shown in figures, such that the head mounted display device HMD1 acknowledge its spatial coordinates SC1 in the space.

The tracking system 100 can be utilized on various type of the head mounted display device HMD1. The tracking system 100 can provide the tracking function to the head mounted display device HMD1, even though the head mounted display device HMD1 does not equip any tracker by itself. The attachable device 110 is reusable. When the user purchases a new head mounted display device, the attachable device 110 can be detached from the head mounted display device HMD1 and mounted onto the new head mounted display device.

Figure 4:
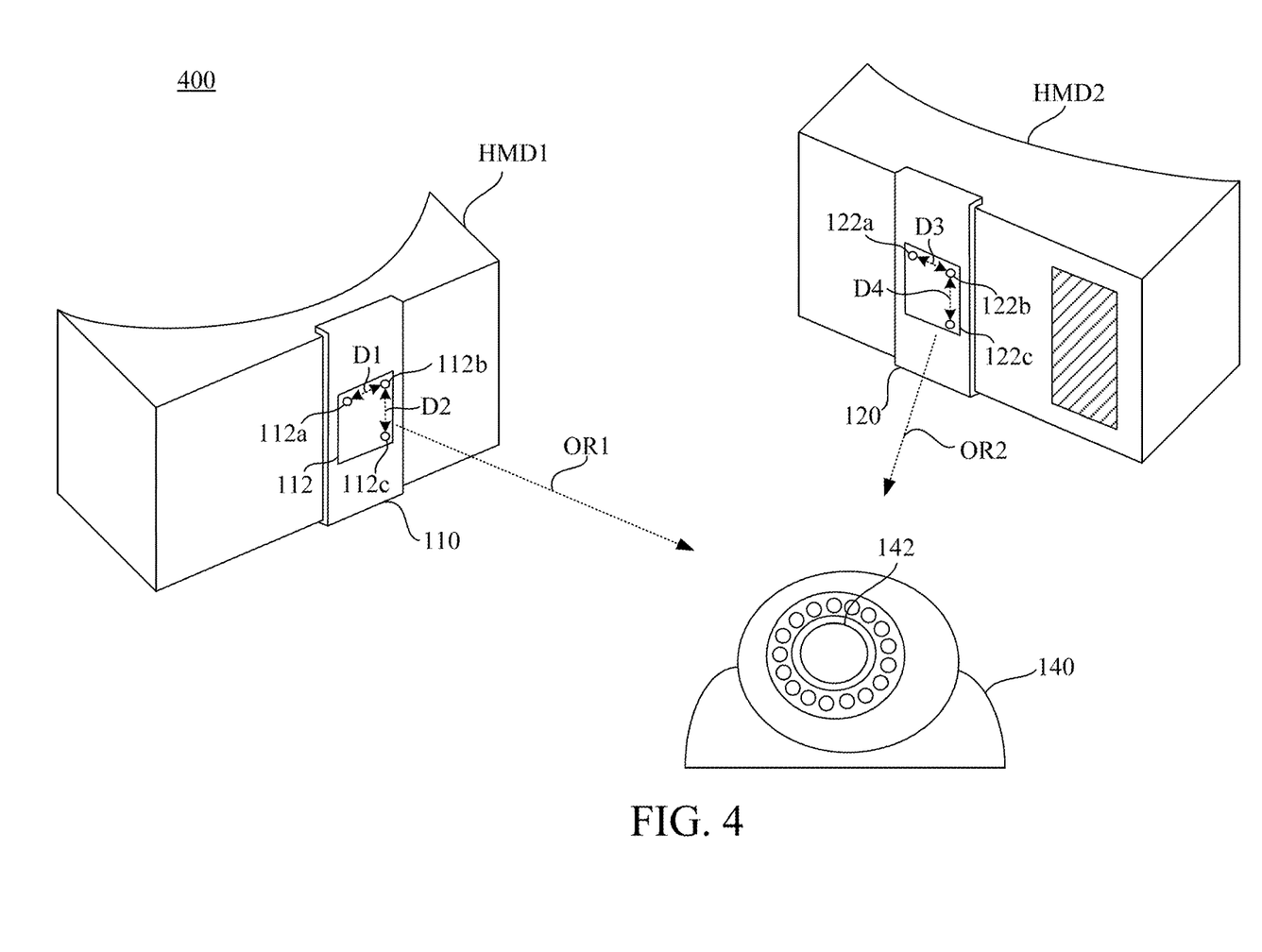
FIG. 4 is a schematic diagram illustrating a tracking system according to another embodiment of the disclosure.

The tracking system in the disclosure is not limited to track the spatial coordinates of one head mounted display device. Reference is made to FIG. 4, which is a schematic diagram illustrating a tracking system 400 according to another embodiment of the disclosure. As shown in FIG. 4, the tracking system 400 includes two attachable devices 110, 120 and the tracking device 140.

The attachable device 110 is an add-on attachment removably mounted on a head mounted display device HMD1. Details of the attachable device 110 are similar to the attachable device 110 discussed in embodiments of FIG. 1 and FIG. 2.

The attachable device 120 is another add-on attachment removably mounted on another head mounted display device HMD2. In the embodiment shown in FIG. 4, the attachable device 120 includes a holding clamp to hold the attachable device 120 on a surface of the head mounted display device HMD2. However, the attachable device 120 is not limited to be attached on the head mounted display device HMD2 in the manner shown in FIG. 4. For example, the attachable device 120 can be fastened on the head mounted display device HMD2 by a connector, such as a clamp, a screw, a lock or a buckle.

The head mounted display device HMD2 can be a virtual reality (VR), augmented reality (AR), substitutional reality (SR) or mixed reality (MR) headset. A user wearing the head mounted display device HMD2 can view a VR/AR/SR/MR scene on a display on the head mounted display device HMD2. It is noticed that the head mounted display devices HMD1 and HMD2 can be different HMD models or the same HMD model. In an embodiment, the attachable devices 110 and 120 can be attached onto different models of the head mounted display devices HMD1 and HMD2. The tracking system 400 can track the positions of different head mounted display devices HMD1 and HMD2 according to the optical radiation OR1 emitted by the attachable devices 110 and the optical radiation OR2 emitted by the attachable devices 120.

Figure 5:
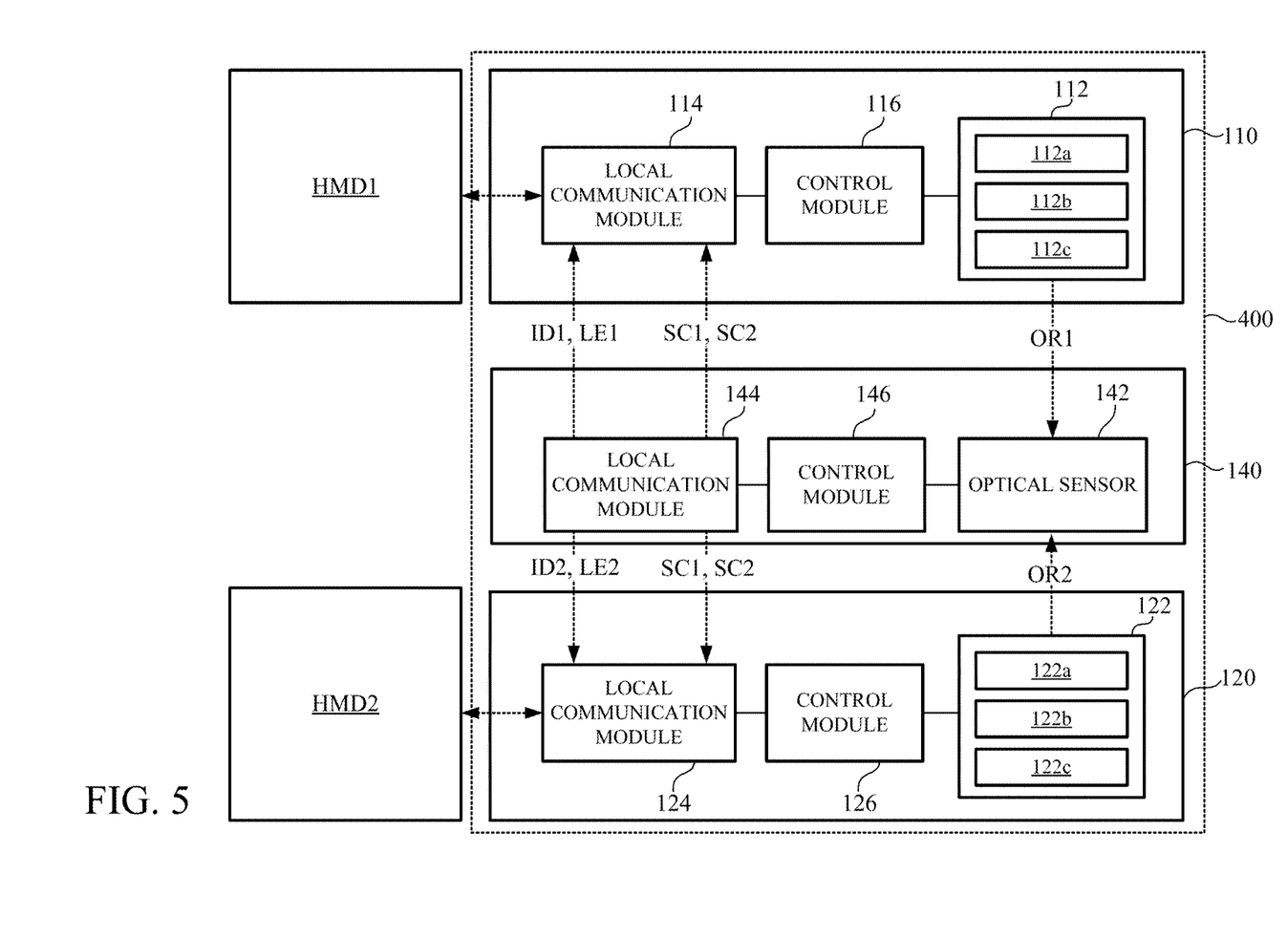
FIG. 5 is a function block diagram of the tracking system shown in FIG.

Reference is further made to FIG. 5, which is a function block diagram of the tracking system 400 shown in FIG. 4. As an embodiment shown in FIG. 4, the attachable device 110 includes the optical emitting module 112, the local communication module 114 and the control module 116. The tracking device 140 includes the optical sensor 142, the local communication module 144 and the control module 146. Components of the attachable device 110 and the tracking device 140 in FIG. 5 are similar to the attachable device 110 and the tracking device 140 in aforesaid embodiments shown in FIG. 2, and not to be repeated here.

The attachable device 120 includes an optical emitting module 122, a local communication module 124 and a control module 126. The optical emitting module 122 is configured for emitting the optical radiation OR2. The local communication module 124 is configured for communicating with the tracking device 140 and/or the head mounted display device HMD2. The local communication module 124 can include at least one of a Bluetooth Low-Energy (BLE) transceiver, a Near Field Communication (NFC) transceiver, a WiFi-direct transceiver, a Zigbee transceiver and any equivalent transceiver. The control module 126 can includes a central processing unit, a processor, a control integrated circuit and/or an image processor. Components of the attachable device 120 are also similar to the attachable device 110 in aforesaid embodiments shown in FIG. 2.

Figure 6:
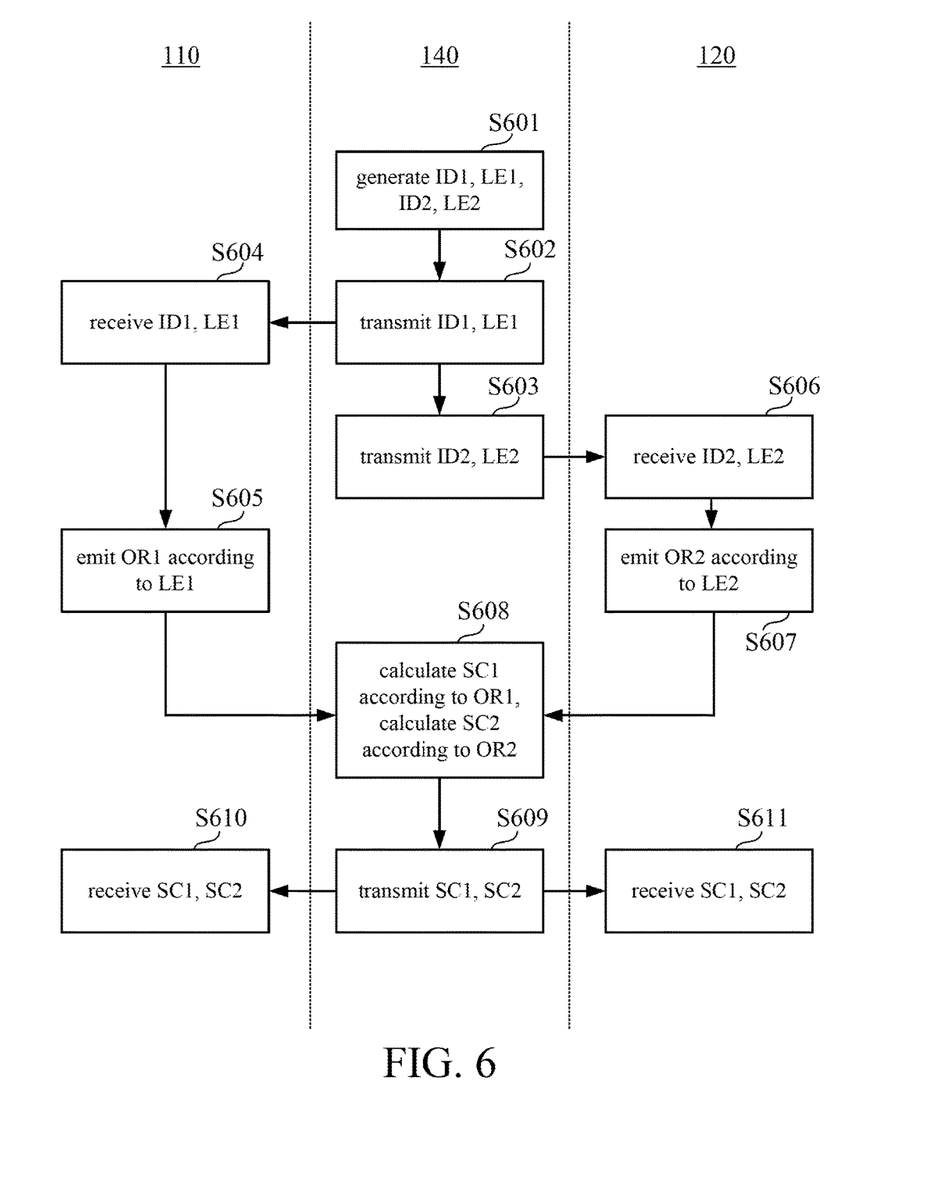
FIG. 6 is a flow diagram illustrating operations performed by the tracking system in FIG. 4.

Reference is further made to FIG. 6, which is a flow diagram illustrating operations performed by the tracking system 400 in FIG. 4 and FIG. 5. After the attachable devices 110 and 120 are respectively mounted on the head mounted display devices HMD1 and HMD2, the local communication modules 114 and 124 of the attachable devices 110 and 120 will communicate with the local communication module 144 of the tracking device 140. The tracking device 140 will acknowledge that there are two attachable devices 110 and 120 to be tracked in the space. In an embodiment, the control module 146 will generate two different identifications ID1 and ID2 in operation S601, and the control module 146 will generate two different light emitting configurations LE1, LE2 in operation S601. One identification ID1 is assigned to the attachable device 110, and another identification ID2 is assigned to the attachable device 120. The identifications ID1 and ID2 can be generated according to the physical addresses (e.g., MAC addresses) of the local communication modules 114 and 124.

In operation S602, the identifications ID1 and the light emitting configurations LE1 are transmitted from the tracking device 140 to the attachable device 110. In operation S603, the identifications ID2 and the light emitting configurations LE2 are transmitted from the tracking device 140 to the attachable device 120.

In operation S604, the attachable device 110 receives the identifications ID1 and the light emitting configurations LE1 by the local communication module 114. In operation S605, the control module 116 of the attachable device 110 trigger the optical emitting module 112 to emit the optical radiation OR1 according to the light emitting configurations LE1.

In operation S606, the attachable device 120 receives the identifications ID2 and the light emitting configurations LE2 by the local communication module 124. In operation S607, the control module 126 of the attachable device 120 trigger the optical emitting module 122 to emit the optical radiation OR2 according to the light emitting configurations LE2.

The light emitting configuration LE1 and the light emitting configuration LE2 are different in at least one of flickering durations, flickering patterns, colors and frequencies.

In an example, the light emitting configuration LE1 is switched between lit and dimmed every 0.5 second, and the emitting configuration LE2 is switched between lit and dimmed every 1 second.

In another example, the light emitting configuration LE1 is lit up all the time, and the light emitting configuration LE2 is lit and dimmed alternatively. In another example, the light emitting configuration LE1 is [lit, dimmed, lit, dimmed, lit, dimmed] in a loop, and the light emitting configuration LE2 is [lit, lit, dimmed, lit, lit, dimmed] in a loop.

In another example, the light emitting configuration LE1 is to emit an infrared radiation and the light emitting configuration LE2 is to emit a visible red radiation. In another example, the light emitting configuration LE1 is to emit an infrared radiation at 300 GHz and the light emitting configuration LE2 is to emit another infrared radiation at 200 GHz.

Since the optical radiations OR1 and OR2 are emitted according to different light emitting configurations LE1 and LE2, the tracking device 140 correspondingly identifies the optical radiation OR1 and the optical radiation OR2 according to flickering durations, flickering patterns, colors or frequencies sensed (depending on the light emitting configurations LE1 and LE2) by the optical sensor 142.

Figure 7A:
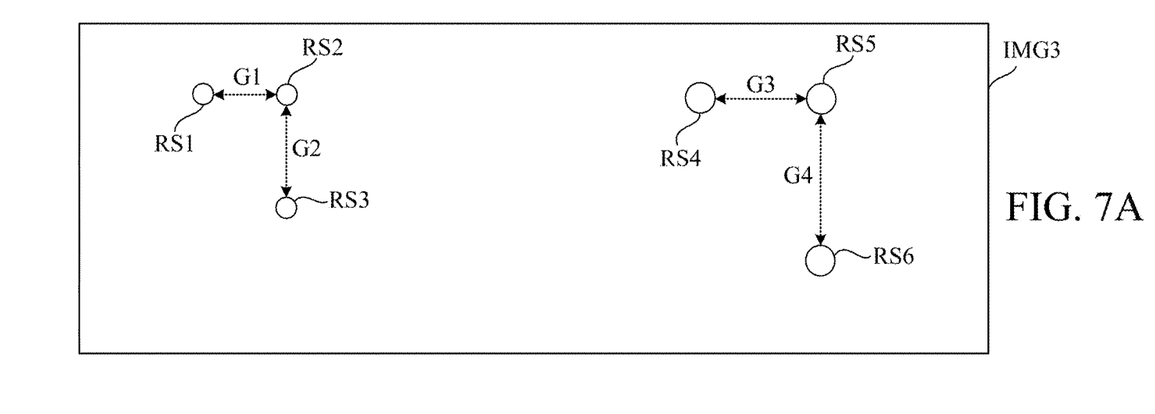
FIG. 7A is a schematic diagram illustrating an image sensed by the optical sensor corresponding to two optical radiations.
Figure 7B:
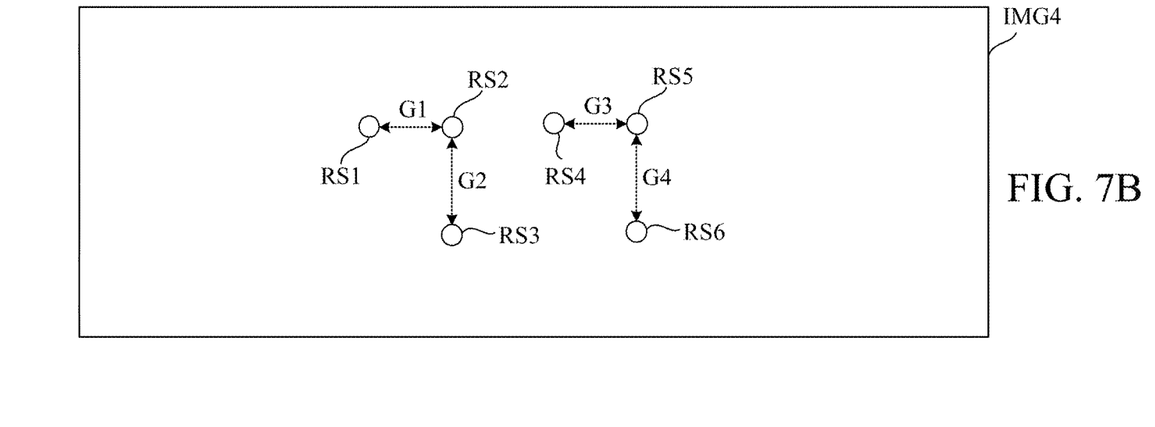
FIG. 7B is a schematic diagram illustrating another image sensed by the optical sensor corresponding to two optical radiations.

Reference is further made to FIG. 7A and FIG. 7B. FIG. 7A is a schematic diagram illustrating an image IMG3 sensed by the optical sensor 142 corresponding to the optical radiation OR1 and the optical radiation OR2. FIG. 7B is a schematic diagram illustrating another image IMG4 sensed by the optical sensor 142 corresponding to the optical radiation OR1 and the optical radiation OR2.

As shown in FIG. 7A, there are radiation spots RS1, RS2 and RS3 corresponding to the optical radiation OR1 and the radiation spots RS4, RS5 and RS6 corresponding to the optical radiation OR2. The correspondence between the radiation spots RS1-RS6 and the optical radiations OR1-OR2 are identified according to flickering durations, flickering patterns, colors or frequencies of the radiation spots RS1-RS6 according to corresponding light emitting configurations LE1 and LE2. The radiation spots RS1-RS3 corresponding to the optical radiation OR1 are located on the left side, on the top level and at the far end relative the tracking device 140. The radiation spots RS4-RS6 corresponding to the optical radiation OR2 are located on the right side, on the middle level and at the near end relative the tracking device 140. Operation S608 is performed to calculate the spatial coordinates SC1 of the attachable device 110 according to the optical radiation OR1, and calculate the spatial coordinates SC2 of the attachable device 120 according to the optical radiation OR2. In the embodiment shown in FIG. 7A, the spatial coordinates SC1 of the attachable device 110 can be [−5, 2, 10] and the spatial coordinates SC2 of the attachable device 120 can be [4, 0, 3].

A horizontal position and a vertical position of the spatial coordinates SC1 according to the locations of the radiation spots RS1-RS3. A horizontal position and a vertical position of the spatial coordinates SC2 according to the locations of the radiation spots RS4-RS6. In an embodiment, a depth position of the spatial coordinates SC1 can be calculated according to the gapping distances (e.g., G1 and G2 in FIG. 7A) between the radiation spots RS1-RS3, and a depth position of the spatial coordinates SC2 can be calculated according to the gapping distances (e.g., G3 and G4 in FIG. 7A) between the radiation spots RS4-RS6. In another embodiment, the depth position of the spatial coordinates SC1 can be calculated according to a signal strength of the optical radiation OR1 sensed by the optical sensor 142, and the depth position of the spatial coordinates SC2 can be calculated according to a signal strength of the optical radiation OR2 sensed by the optical sensor 142. The calculation of the spatial coordinates SC1 and the spatial coordinates SC2 can be referred to aforesaid embodiment in FIG. 3A and FIG. 3B, and not to repeated here.

As another embodiment shown in FIG. 7B, there are radiation spots RS1, RS2 and RS3 corresponding to the optical radiation OR1 and the radiation spots RS4, RS5 and RS6 corresponding to the optical radiation OR2. In the embodiment shown in FIG. 7A, the spatial coordinates SC1 of the attachable device 110 can be [−1, 0, 10] and the spatial coordinates SC2 of the attachable device 120 can be [1, 0, 10].

In operation S609, the tracking device 140 transmits both of the spatial coordinates SC1 and the spatial coordinates SC2 to the attachable device 110, and the attachable device 120 in an embodiment. In another embodiment, the tracking device 140 transmits both of the spatial coordinates SC1 and the spatial coordinates SC2 directly to the head mounted device HMD1 and the head mounted device HMD2.

In the embodiment show in FIG. 6, the attachable device 110 will receive both of the spatial coordinates SC1 and the spatial coordinates SC2 in operation S610. In an embodiment, the spatial coordinates SC1 transmitted from the tracking device 140 to the attachable device 110 is labelled with the identification ID1. The second spatial coordinates SC2 transmitted from the tracking device 140 to the attachable device 120 is labelled with the identification ID2. In other words, the attachable device 110 may receive "ID1: [−5, 2, 10], ID2: [4, 0, 3]" corresponding to the example shown in FIG. 7A. The attachable device 110 has acknowledged the identification ID1 assigned to the attachable device 110. The attachable device 110 will recognize the spatial coordinates SC1, [−5, 2, 10], as its own position in the space, and also the attachable device 110 will acknowledge that there is another device located at the spatial coordinates SC2, [4, 0, 3].

On the other hand, the attachable device 120 will receive both of the spatial coordinates SC1 and the spatial coordinates SC2 in operation S611. The spatial coordinates SC1 transmitted from the tracking device 140 to the attachable device 120 is labelled with the identification ID1. The second spatial coordinates SC2 transmitted from the tracking device 140 to the attachable device 120 is labelled with the identification ID2. The attachable device 120 may receive "ID1: [−5, 2, 10], ID2: [4, 0, 3]" corresponding to the example shown in FIG. 7A. The attachable device 120 has acknowledged the identification ID2 assigned to the attachable device 120. The attachable device 120 will recognize the spatial coordinates SC2, [4, 0, 3], as its own position in the space, and also the attachable device 120 will acknowledge that there is another device located at the spatial coordinates SC1, [−5, 2, 10].

In another example shown in FIG. 7B, the attachable device 110 will recognize the spatial coordinates SC1, [−1, 0, 10], as its own position in the space, and also the attachable device 110 will acknowledge that there is another device located at the spatial coordinates SC2, [1, 0, 10]. The attachable device 120 will recognize the spatial coordinates SC2, [1, 0, 10], as its own position in the space, and also the attachable device 120 will acknowledge that there is another device located at the spatial coordinates SC1, [−1, 0, 10]. In this example, the attachable device 110 and the attachable device 120 will acknowledge that there is another device nearby, at least one of the attachable device 110 and the attachable device 120 can generate a warning signal (e.g., a warning light indictor, a warning sound, a text message to be shown on the head mount display devices HMD1/HMD2) to avoid a collision between two users in the space.

Based on aforesaid embodiments, the tracking system 400 can be utilized on various types of the head mounted display devices HMD1 and HMD2. The embodiments are demonstrated by two attachable devices 110 and 120 on two head mount display devices HMD1 and HMD2. However, the tracking system 400 is not limited thereto. The tracking system 400 can include more than two attachable devices mounted on respective head mount display devices. The tracking system 400 can provide the spatial coordinates about all of the attachable devices in the surrounding area to each of the attachable devices.

In aforesaid embodiment, the tracking system 100 or 400 include at least one attachable device removably mounted on a head mounted display device. The tracking device is utilized to track the position of the at least one attachable device. However, the disclosure is not limited thereto. In another embodiment, the optical emitting module for emitting the optical radiation can be built in the head mounted display device.

Figure 8:
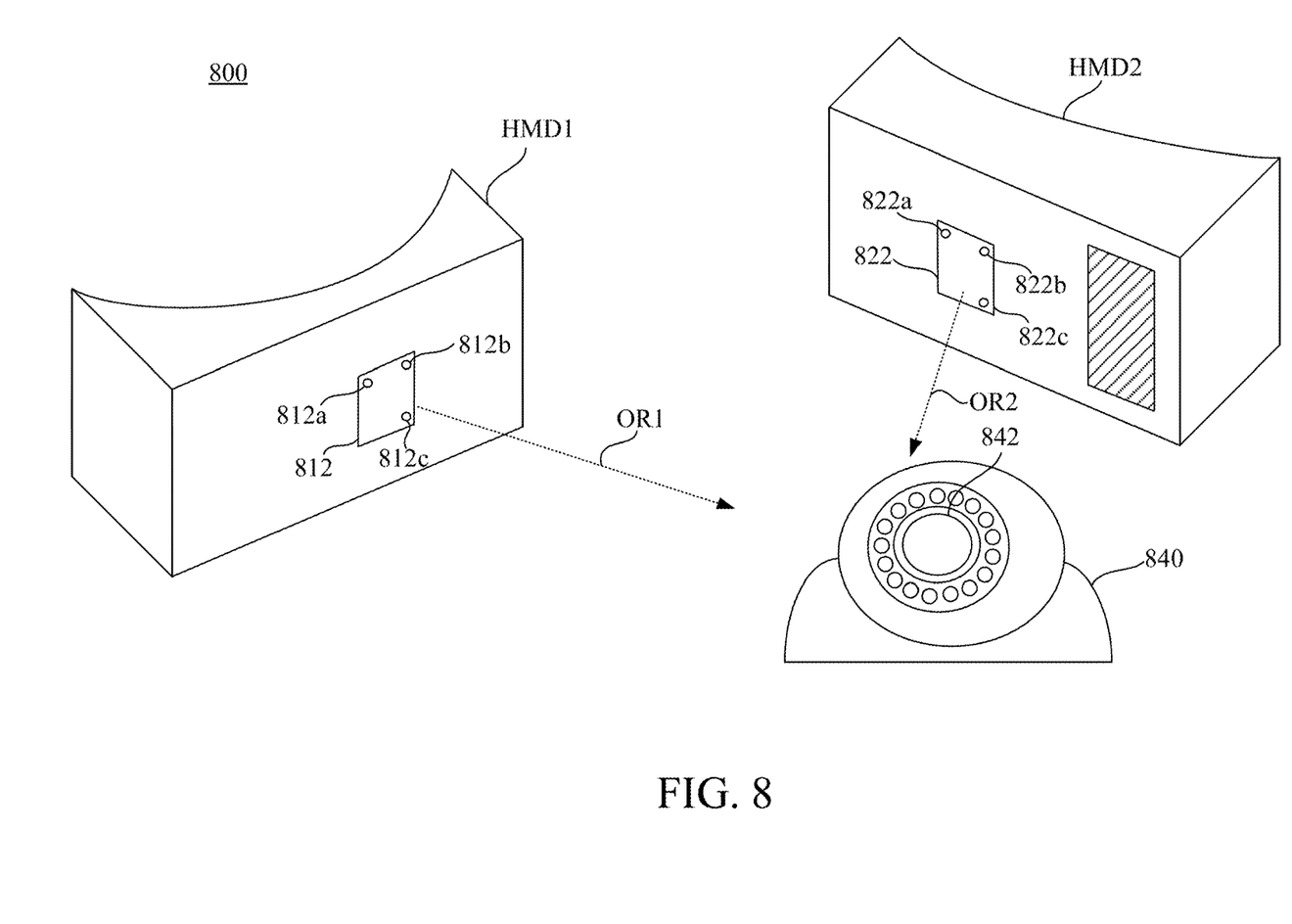
FIG. 8 is a schematic diagram illustrating a virtual reality system according to another embodiment of the disclosure.

Reference is further made to FIG. 8, which is a schematic diagram illustrating a virtual reality system 800 according to another embodiment of the disclosure. The virtual reality system 800 includes a head mounted display device HMD1 and a tracking device 840. The head mounted display device HMD1 includes an optical emitting module 812 for emitting optical radiation OR1. The tracking device 840 is communicated with the head mounted display device HMD1. The tracking device 840 includes an optical sensor 842 for receiving the optical radiation OR1.

The tracking device 840 is configured to calculate spatial coordinates of the head mounted display device HMD1 relative to the tracking device 840 according to the optical radiation OR1 sensed by the optical sensor 842. The tracking device 840 is configured to transmit the spatial coordinates to the head mounted display device HMD1.

In an embodiment, the virtual reality system 800 includes another head mounted display device HMD2 as shown in FIG. 8. The head mounted display device HMD2 includes the optical emitting module 822 for emitting optical radiation OR2.

Figure 9:
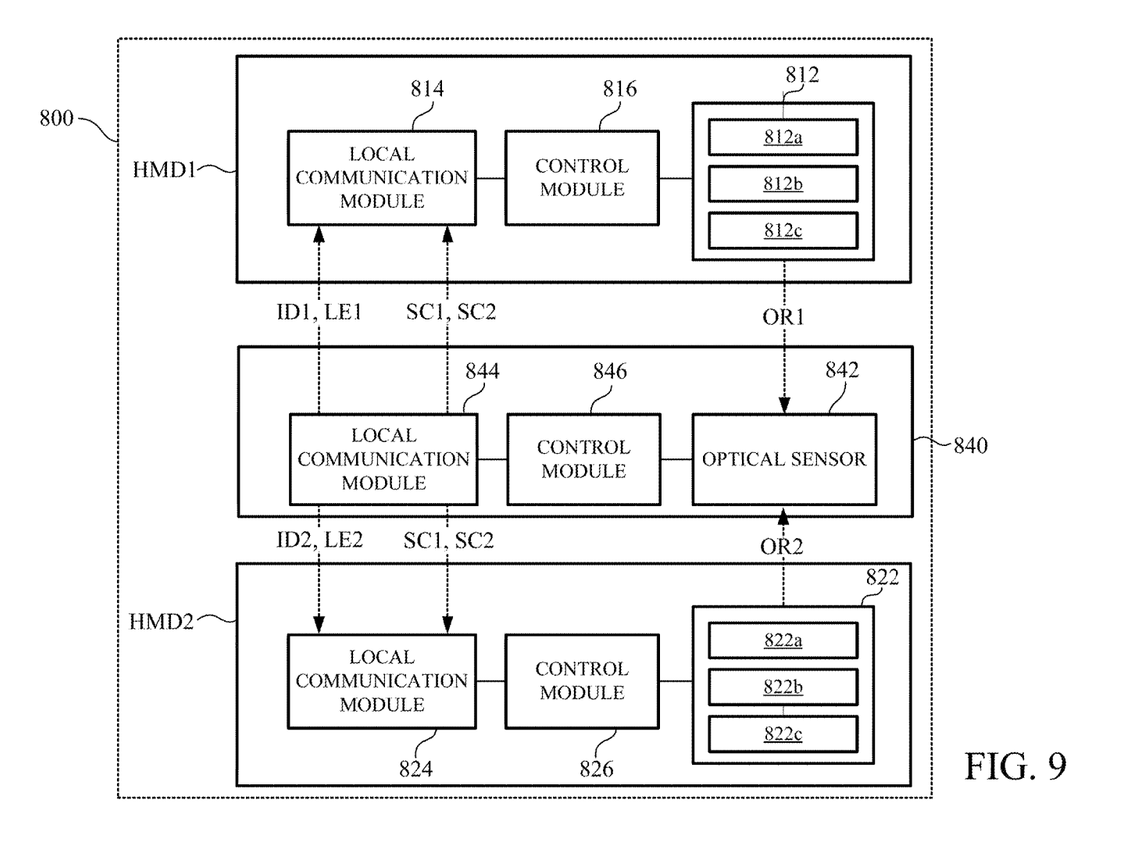
FIG. 9 is a function block diagram of the virtual reality system shown in FIG. 8.

Reference is further made to FIG. 9, which is a function block diagram of the virtual reality system 800 shown in FIG. 8. The head mounted display device HMD1 includes the optical emitting module 812, a local communication module 814 and a control module 816. In an embodiment, the optical emitting module 812 includes light emitting units 812a, 812b and 812c. The light emitting units 812a-812c are disposed on the head mounted display device HMD1 and each of the light emitting units 812a-812c are spaced from each other. The head mounted display device HMD2 includes the optical emitting module 822, a local communication module 824 and a control module 826. In an embodiment, the optical emitting module 822 includes light emitting units 822a, 822b and 822c. The light emitting units 822a-822c are disposed on the head mounted display device HMD2 and each of the light emitting units 822a-822c are spaced from each other. The optical emitting module 812, the local communication module 814 and the control module 816 of the head mounted display device HMD1 are similar to the optical emitting module 112, the local communication module 114 and the control module 116 of the attachable device 110 in aforesaid embodiment of FIG. 2 and FIG. 5. The optical emitting module 822, the local communication module 824 and the control module 826 of the head mounted display device HMD2 are similar to the optical emitting module 122, the local communication module 124 and the control module 126 of the attachable device 120 in aforesaid embodiment of FIG. 5. The main difference between embodiments in FIG. 9 and FIG. 5 is that the optical emitting module 812, the local communication module 814 and the control module 816 are disposed in the head mounted display device HMD1 in FIG. 9 (not in an attachable device), and the optical emitting module 822, the local communication module 824 and the control module 826 are disposed in the head mounted display device HMD2 in FIG. 9 (not in an attachable device). Operations and behaviors of the optical emitting module 812, the local communication module 814, the control module 816, the optical emitting module 822, the local communication module 824 and the control module 826 can be referred to the embodiment shown in FIG. 4, FIG. 5 and FIG. 6, and not repeated here.

In another embodiment, the optical emitting module 812 of the head mounted display device HMD1 can be implemented by a flash light module on a smartphone in the head mounted display device HMD1. The local communication module 814 can be implemented by a BLE/NFC/WiFi module on the smartphone in the head mounted display device HMD1. The control module 816 can implemented by a processor of the smartphone in the head mounted display device HMD1. The optical emitting module 822 of the head mounted display device HMD2 can be implemented by a flash light module on a smartphone of the head mounted display device HMD2. The local communication module 824 can be implemented by a BLE/NFC/WiFi module on the smartphone in the head mounted display device HMD2. The control module 826 can implemented by a processor of the smartphone in the head mounted display device HMD2. In this embodiment, the virtual system 800 can be implemented without extra hardware components on the head mounted display devices HMD1 and HMD2.

Based on aforesaid embodiments, the tracking system 800 can provide the spatial coordinates SC1 and SC2 about all of the head mounted display devices HMD1 and HMD2 in the surrounding area to each of the head mounted display devices HMD1 and HMD2. The head mounted display device HMD1 can acknowledge its own spatial coordinates SC1 and also the spatial coordinates SC2 of the head mounted display device HMD2. On the other hand, the head mounted display device HMD2 can acknowledge its own spatial coordinates SC2 and also the spatial coordinates SC1 of the head mounted display device HMD1. When the spatial coordinates SC1 and the spatial coordinates SC2 are close to each other, a warning signal can be generated to avoid the collision between the head mounted display devices HMD1 and HMD2.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tracking system, comprising:
   a first attachable device, capable of being removably mounted on a first head mounted display device, the first attachable device comprising a first optical emitting module for emitting first optical radiation, wherein the first optical emitting module comprises a plurality of first light emitting units; and
   a tracking device, communicated with the first attachable device, the tracking device comprising an optical sensor for receiving the first optical radiation, the tracking device calculating first spatial coordinates of the first attachable device relative to the tracking device according to the first optical radiation sensed by the optical sensor, and the tracking device transmitting the first spatial coordinates to the first attachable device or the first head mounted display device, wherein the first optical radiation sensed by the tracking device comprises a plurality of radiation spots corresponding to the first light emitting units, the tracking device calculates the first spatial coordinates of the first attachable device according to at least one of a dimension of the radiation spots, a distribution of the radiation spots and a signal strength of the first optical radiation sensed by the optical sensor.

2. The tracking system of claim 1, wherein the first light emitting units are disposed on the first attachable device and each of the first light emitting units are spaced from each other.

3. The tracking system of claim 1, wherein a first pair of the first light emitting units are spaced from each other with a first distance, a second pair of the first light emitting units are spaced from each other with a second distance different from the first distance, the tracking device recognize a mapping relationship between the first light emitting units and the radiation spots according to a proportion between the first distance and the second distance, the tracking device calculates a tilted angle of the first attachable device according to the distribution of the radiation spots.

4. The tracking system of claim 1, wherein the first attachable device further comprises a first local communication module configured for communicating with the tracking device and the first head mounted display device.

5. The tracking system of claim 1, further comprising:
   a second attachable device, capable of being removably mounted on a second head mounted display device, the second attachable device comprising a second optical emitting module for emitting the second optical radiation,
   wherein the tracking device is communicated with the second attachable device, the optical sensor of the tracking device is further configured for receiving the second optical radiation, the tracking device calculates second spatial coordinates of the second attachable device relative to the tracking device according to the second optical radiation sensed by the optical sensor, the tracking device transmits both of the first spatial coordinates and the second spatial coordinates to at least one of the first attachable device and the first head mounted display device and at least one of the second attachable device and the second head mounted display device.

6. The tracking system of claim 5, wherein the tracking device generates a first identification and a first light emitting configuration and transmits to the first attachable device, the first optical emitting module emits the first optical radiation according to the first light emitting configuration, the tracking device generates a second identification and a second light emitting configuration and transmits to the second attachable device, the second optical emitting module emits the second optical radiation according to the second light emitting configuration.

7. The tracking system of claim 6, wherein the first light emitting configuration and the second light emitting configuration are different in at least one of flickering durations, flickering patterns, colors and frequencies, the tracking device correspondingly identifies the first optical radiation and the second optical radiation according to flickering durations, flickering patterns, colors or frequencies sensed by the optical sensor.

8. The tracking system of claim 7, wherein the first spatial coordinates transmitted from the tracking device to the first attachable device, the first head mounted display device, the second attachable device or the second head mounted display device is labelled with the first identification, the second spatial coordinates transmitted from the tracking device to the first attachable device, the first head mounted display device, the second attachable device or the second head mounted display device is labelled with the second identification.

9. The tracking system of claim 1, wherein the first optical emitting module is an infrared emitting module, the optical sensor of the tracking device is an infrared camera.

10. An attachable device, configured to being mounted on a head mounted display device, the attachable device comprising:
    a local communication module configured to communicate with a tracking device, the local communication module receiving a light emitting configuration from the tracking device; and
    an optical emitting module comprising a plurality of light emitting units and configured for generating optical radiation according to the light emitting configuration, wherein the optical radiation comprises a plurality of radiation spots corresponding to the light emitting units,
    wherein, after the optical emitting module generates the optical radiation, the local communication module is configured to receive spatial coordinates calculated by the tracking device according to at least one of a dimension of the radiation spots, a distribution of the radiation spots and a signal strength of the optical radiation, the spatial coordinates indicate a location of the attachable device relative to the tracking device.

11. A virtual reality system, comprising:
    a first head mounted display device, the first head mounted display device comprising a first optical emitting module for emitting first optical radiation, wherein the first optical emitting module comprises a plurality of first light emitting units; and
    a tracking device, communicated with the first head mounted display device, the tracking device comprising an optical sensor for receiving the first optical radiation, the tracking device calculating first spatial coordinates of the first head mounted display device relative to the tracking device according to the first optical radiation sensed by the optical sensor, and the tracking device transmitting the first spatial coordinates to the first head mounted display device, wherein the first optical radiation sensed by the tracking device comprises a plurality of radiation spots corresponding to the first light emitting units, the tracking device calculates the first spatial coordinates of the first head mounted display device according to at least one of a dimension of the radiation spots, a distribution of the radiation spots and a signal strength of the first optical radiation sensed by the optical sensor.

12. The virtual reality system of claim 11, wherein the first light emitting units are disposed on the first head mounted display device and each of the first light emitting units are spaced from each other.

13. The tracking system of claim 11, wherein a first pair of the first light emitting units are spaced from each other with a first distance, a second pair of the first light emitting units are spaced from each other with a second distance different from the first distance, the tracking device recognize a mapping relationship between the first light emitting units and the radiation spots according to a proportion between the first distance and the second distance, the tracking device calculates a tilted angle of the first attachable device according to the distribution of the radiation spots.

14. The virtual reality system of claim 11, further comprising:
a second head mounted display device comprising a second optical emitting module for emitting the second optical radiation,
wherein the tracking device is communicated with the second head mounted display device, the optical sensor of the tracking device is further configured for receiving the second optical radiation, the tracking device calculates second spatial coordinates of the second head mounted display device relative to the tracking device according to the second optical radiation sensed by the optical sensor, the tracking device transmits both of the first spatial coordinates and the second spatial coordinates to at least one of the first head mounted display device and the second head mounted display device.

15. The virtual reality system of claim 14, wherein the tracking device generates a first identification and a first light emitting configuration and transmits to the first head mounted display device, the first optical emitting module emits the first optical radiation according to the first light emitting configuration, the tracking device generates a second identification and a second light emitting configuration and transmits to the second head mounted display device, the second optical emitting module emits the second optical radiation according to the second light emitting configuration.

16. The virtual reality system of claim 15, wherein the first light emitting configuration and the second light emitting configuration are different in at least one of flickering durations, flickering patterns, colors and frequencies, the tracking device correspondingly identifies the first optical radiation and the second optical radiation according to flickering durations, flickering patterns, colors or frequencies sensed by the optical sensor.

17. The virtual reality system of claim 16, wherein the first spatial coordinates transmitted from the tracking device to at least one of the first head mounted display device and the second head mounted display device is labelled with the first identification, the second spatial coordinates transmitted from the tracking device to at least one of the first head mounted display device and the second head mounted display device is labelled with the second identification.

18. The virtual reality system of claim 11, wherein the first optical emitting module is an infrared emitting module, the optical sensor of the tracking device is an infrared camera.

* * * * *